358-86. XR 3,919,463 SR

United States Patent [19] 358/84 Y 358/86

Walding

[11] 3,919,463

[45] Nov. 11, 1975

[54] PAY TV SYSTEM USING UHF INPUT

[75] Inventor: Eugene C. Walding, Arlington Heights, Ill.

[73] Assignee: Oak Industries Inc., Crystal Lake, Ill.

[22] Filed: Apr. 25, 1974

[21] Appl. No.: 464,132

[52] U.S. Cl. ............ 178/5.1; 178/DIG. 13; 325/33; 325/308

[51] Int. Cl.$^2$ ............ H04N 1/44

[58] Field of Search ........ 178/5.1, DIG. 13; 325/33, 325/308, 461

[56] References Cited

UNITED STATES PATENTS 3,387,083 6/1968 Farber et al. ............ 178/5.1
3,555,430 1/1971 Fischer et al. ............ 325/461

*Primary Examiner*—Maynard R. Wilbur
*Assistant Examiner*—S. C. Buczinski
*Attorney, Agent, or Firm*—Kinzer, Plyer, Dorn & McEachran

[57] ABSTRACT

A TV system, for example the type used in hotels or motels, provides non-subscription channels and a subscription channel all on the same facilities. The subscription channel is transmitted at the same frequency as the normal output frequency of a UHF tuner. Means are provided to connect the facilities to the conventional VHF input of a TV receiver and to the UHF input of a receiver VHF tuner. When in the latter position, the VHF tuner oscillator is disabled and a billing transmitter is activated to send appropriate billing information back to the transmitting location.

9 Claims, 2 Drawing Figures

PAY TV SYSTEM USING UHF INPUT

SUMMARY OF THE INVENTION

The present invention relates to a subscription TV system for use in hotels, motels or the like and has particular relation to such a system in which the subscription channel is transmitted at the receiver IF frequency, thus utilizing the normally unused UHF input to a VHF tuner.

A primary purpose of the invention is a simply constructed reliably operable system of the type described.

Another purpose is a subscription TV system utilizing the same facilities as non-subscription channels and eliminating the conventional converter.

Another purpose is a subscription TV system of the type described transmitting the subscription channel at the output frequency of a UHF tuner.

Another purpose is a subscription TV system of the type described utilizing the same facilities for transmitting the subscription channel, non-subscription channels and billing information.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Most motel and hotel TV systems receive conventional on-air VHF signals and provide said signals over cables within the building or buildings to each of the individual receivers. Normally, such an MATV system will not pick up and distribute UHF channels. The UHF portion of each receiver is normally unused, although the receivers will have the conventional UHF tuner due to the manner in which the receivers are manufactured. The present invention takes advantage of the fact that such UHF equipment is not used and, therefore, there is an unused entry port into the VHF receiver.

Figure 1:
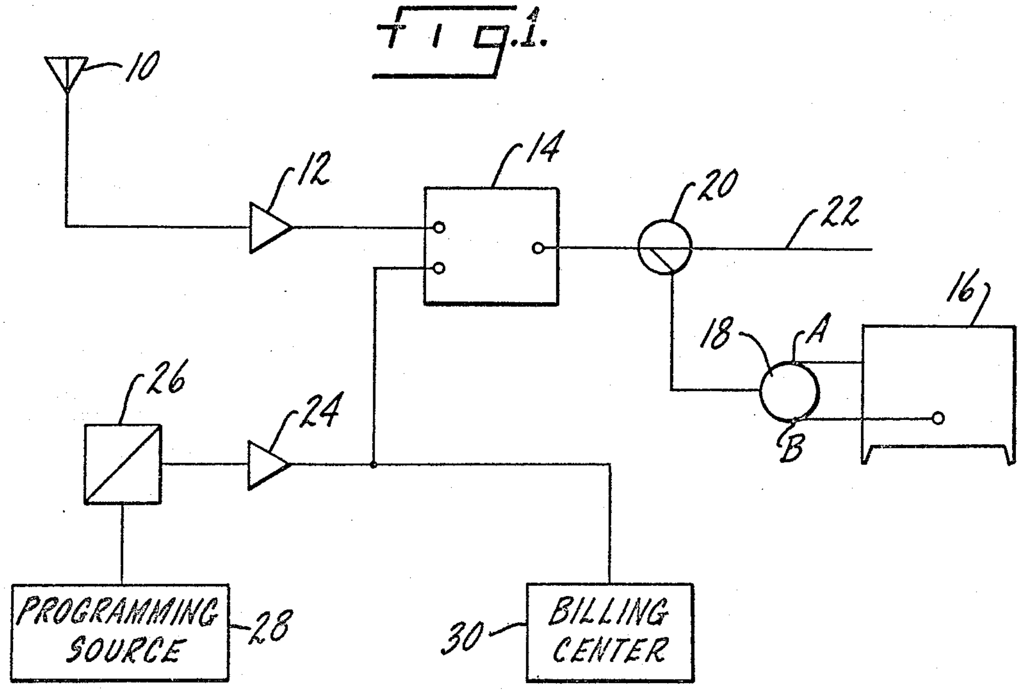
FIG. 1 is a diagrammatic illustration of a subscription TV system of the type described.

In FIG. 1, an antenna is indicated at 10 and such an antenna in a typical MATV system will receive all the VHF signals in the area. The antenna 10 is connected to an amplifier 12 and the amplifier 12 in turn is connected to a combiner 14.

Normally each room in a hotel or motel has one or more receivers and one such receiver is indicated at 16. The receiver 16 is connected through splitter 18 to a tap 20, the tap 20 in turn being connected in the cable 22 which carries the TV signals to all of the rooms or individual buildings in the complex.

The combiner 14 receives the subscription channel from an amplifier 24 connected to a modulator 26 which in turn is connected to a programming source 28. The locally transmitted subscription channel will be at 45 mhz (video carrier 45.75 — sound carrier 41.25 mhz), the normal IF frequency of a receiver and the normal UHF tuner output. Also connected to the combiner 14 is a billing center or billing receiver 30 which is adapted to receive billing information whenever a receiver is operated in the subscription mode.

Splitter 18 has an "A" output and a "B" output. The A output connects directly to the VHF input of receiver 16. The B output is connected to the UHF input of the VHF tuner forming a part of receiver 16.

Figure 2:
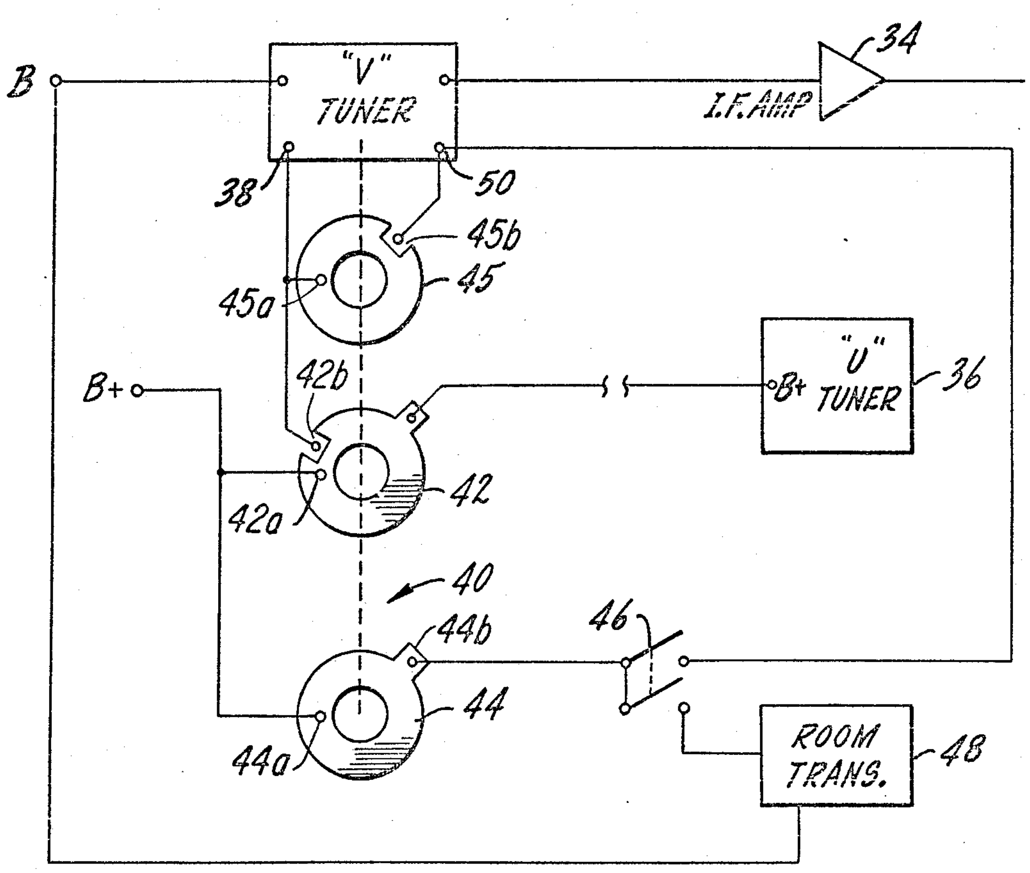
FIG. 2 is a schematic illustrating the switching means for connecting the receiver to either a subscription or non-subscription channel.

In FIG. 2 the VHF tuner is indicated at 32 and is shown connected to the B output of splitter 18. The output of the VHF tuner 32 is connected to a typical IF amplifier 34 forming a part of the receiver 16. A room status transmitter or billing transmitter 48 is connected to splitter B output so that billing information, at a frequency substantially below any other frequency on the cable, for example below 40 mhz, can be sent back to the billing center 30 over cable 22. The particular receiver may be identified by a tone, or more likely by a digital address which will tell the billing center when a particular receiver has been turned to the subscription mode.

A rotary switch is diagrammatically indicated at 40 and has switch sections 42, 44 and 45, each having stator input connections 42*a*, 44*a* and 45*a*. When switch 40 is in the position shown, switch section 44 is effective, through rotor contact 44*b*, to connect B+ to an order switch 46 which, when closed, will proivide B+ to the tuner B+ terminal 50 and to room transmitter 48. The position shown for switch 40 is the subscription position and B+ will be connected to the room status transmitter to start the transmitter while at the same time B+ will be provided for the VHF tuner so as to pass the subscription channel. This only takes place when order switch 46 is closed. The UHF tuner is shown at 36 and will be disconnected as shown by the gap in the line normally connecting the tuner to switch section 42.

When switch 40 is moved away from the position shown, B+ will be provided, through switch section 42, by rotor contact 42*b*, to the VHF oscillator B+ terminal 38 and through switch section 45 and its rotor contact 45*b* to RF B+ terminal 50 of the VHF tuner. It should be understood that normally switch 40 will be a part of the conventional rotary channel selector switch of the tuner. Thus, when the channel switch is in the "U" position, it will be in the position shown. When it is in the VHF position, VHF channels will be passed through the VHF tuner in the normal manner.

As indicated above, the invention utilizes the normally unused UHF input of a VHF tuner of an MATV system receiver. It is not necessary to have a converter to thus provide subscription and non-subscription channels over the same facilities. The subscription channel will be transmitted at the IF frequency of the receiver, for example 45 mhz, which is the same frequency as the output of a conventional UHF tuner. This signal will be directed through the VHF tuner in the same manner as a UHF signal and will be shown on the receiver in the normal manner. Whenever the switch is set to receive the subscription channel, a room status transmitter or billing transmitter will be simultaneously activated and will transmit billing information, on the same facilities, and at a frequency substantially below the transmitted TV channels, back to the transmitting location.

Whereas the preferred form of the invention has been shown and described herein, it should be realized that there may be many modifications, substitutions and alterations thereto.

The embodiments of the invention in which an exclusive property or privilege is claimed are defined as follows:

1. A method of providing a subscription TV channel on the same facilities as non-subscription TV channels, including the steps of transmitting a subscription TV channel at a frequency which is the same as the output frequency of a UHF tuner, providing a connection between the facilities and the UHF input of a TV receiver VHF tuner, and disabling the VHF tuner oscillator while passing the subscription channel through the VHF tuner.

2. The method of claim 1 further characterized by and including the step of transmitting billing information from each TV receiver, over the same facilities, to the transmission source.

3. The method of claim 2 further characterized by and including the step of initiating the transmitter for billing information simultaneously with disabling the VHF tuner oscillator.

4. The method of claim 1 further characterized in that said subscription channel is transmitted at a carrier frequency of about 45 mhz.

5. A subscription TV system utilizing the same facilities as non-subscription TV channels including transmitting means connected to the facilities and transmitting a subscription TV channel at a frequency the same as the output frequency of a UHF tuner, a plurality of TV receivers each having a VHF tuner with a UHF input, each of said receivers being connected to said facilities, means at each receiver for connecting said facilities to the VHF input of each receiver and to the UHF input of the receiver VHF tuner, and switch means at each receiver for disabling the VHF tuner oscillator when said tuner is in a predetermined position.

6. The subscription TV system of claim 5 further characterized by and including a billing transmitter at each receiver location, and a billing receiver at the transmitting location, said switch means for disabling the VHF tuner oscillator being connected to said billing transmitter for operating the same when said VHF tuner oscillator is disabled.

7. The system of claim 6 further characterized in that said billing transmitter operates at a frequency substantially below that of the subscription TV channel.

8. The system of claim 6 further characterized by and including multiposition switch means at each receiver location connected to said billing transmitter and VHF tuner, a B+ connection to said switch means, one position of said switch means providing B+ for said VHF tuner oscillator, and another position of said switch means removing B+ from said VHF tuner oscillator.

9. The system of claim 8 further characterized by and including a second switch means connected to said first switch means and to said billing transmitter.

* * * * *